(12) United States Patent
Khizri et al.

(10) Patent No.: US 12,124,989 B1
(45) Date of Patent: Oct. 22, 2024

(54) SYSTEMS AND METHODS FOR PACKAGE MARKING FOR DELIVERY EFFICIENCY

(71) Applicant: Amazon Technologies, Inc., Seattle, WA (US)

(72) Inventors: Taimoor Jawaid Khizri, Mansfield, TX (US); Matthew Kenneth Bellamy, Kirkland, WA (US); Liron David Yedidsion, Redmond, WA (US); Shubham Dabas, Delhi (IN); Vipin Kumar Singla, Gurgaon (IN); Fnu Shashank Kumar, Benares (IN); Devinder Singh, Haryana (IN); Shailendra Singh Rajawat, Everett, WA (US); William Wei-Chi Chen, Bellevue, WA (US); Arnav Anshul, Jersey city, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/864,926

(22) Filed: Jul. 14, 2022

(51) Int. Cl.
*G06Q 10/0833* (2023.01)
*G06Q 10/047* (2023.01)

(52) U.S. Cl.
CPC ....... *G06Q 10/0833* (2013.01); *G06Q 10/047* (2013.01)

(58) Field of Classification Search
None
See application file for complete search history.

(56) References Cited

U.S. PATENT DOCUMENTS

| | | | | |
|---|---|---|---|---|
| 6,783,063 | B2* | 8/2004 | Holden | B07C 3/18 235/379 |
| 9,524,485 | B1* | 12/2016 | Shakes | G06Q 10/087 |
| 10,011,387 | B1* | 7/2018 | Payauys | B65B 57/02 |
| 10,089,593 | B1* | 10/2018 | Griffith | G06Q 10/083 |
| 10,121,118 | B1* | 11/2018 | Kim | G06Q 10/0832 |
| 10,596,602 | B2* | 3/2020 | Chen | G06Q 10/08355 |

(Continued)

OTHER PUBLICATIONS

Anonymous; "Method and system to add unique human-readable tag on delivery package"; published Dec. 17, 2015; IP.com Prior Art Database; pp. 1-5; https://priorart.ip.com/IPCOM/000244497 (Year: 2015).*

*Primary Examiner* — Emmett K. Walsh
*Assistant Examiner* — Michael C Moroney
(74) *Attorney, Agent, or Firm* — Eversheds Sutherland (US) LLP

(57) ABSTRACT

Systems and methods are disclosed for determining a visual indicator for a package based on a delivery address for the package and a location of the delivery address along a delivery route. An optimized delivery route may be created for packages to be delivered at a given time. At the fulfillment center, a delivery system may label a package prior to loading the package on a delivery vehicle. The delivery system may determine the appropriate visual indicator (e.g., color and/or pattern) or the visual indicator may be randomly selected. The delivery system may generate a label having the visual indicator. The package may be deposited into a certain bin with other packages having a delivery address in close proximity. The delivery system may generate a user interface on a user device that indicates that the package has a certain visual indicator to facilitate sorting and identification of the package.

18 Claims, 9 Drawing Sheets

(56) References Cited

U.S. PATENT DOCUMENTS

| | | | | |
|---|---|---|---|---|
| 10,867,275 | B1* | 12/2020 | Dholakia | G06V 20/52 |
| 10,915,804 | B1* | 2/2021 | Shmulevich | G06Q 10/083 |
| 2002/0123918 | A1* | 9/2002 | Brown | G06Q 10/06 |
| | | | | 705/28 |
| 2003/0113151 | A1* | 6/2003 | Yokoyama | G09F 3/0297 |
| | | | | 400/103 |
| 2006/0095778 | A1* | 5/2006 | He | G06Q 10/087 |
| | | | | 713/180 |
| 2006/0275065 | A1* | 12/2006 | Bunsey | G06F 15/00 |
| | | | | 400/62 |
| 2009/0223872 | A1* | 9/2009 | Robbins | B07C 3/00 |
| | | | | 209/3.3 |
| 2011/0004571 | A1* | 1/2011 | Parikh | B07C 5/342 |
| | | | | 705/500 |
| 2015/0231896 | A1* | 8/2015 | Hattrup | G06Q 10/08 |
| | | | | 493/320 |
| 2015/0235165 | A1* | 8/2015 | Miette | B07C 3/02 |
| | | | | 705/337 |
| 2016/0263623 | A1* | 9/2016 | Wojdyla | B07C 1/04 |
| 2016/0292630 | A1* | 10/2016 | Jones | G06Q 10/087 |
| 2017/0320101 | A1* | 11/2017 | Bombaugh | B07C 3/005 |
| 2020/0398313 | A1* | 12/2020 | Lenhard | B07C 3/18 |
| 2022/0138885 | A1* | 5/2022 | Freeman | G06K 19/0723 |
| | | | | 235/384 |

* cited by examiner

SYSTEMS AND METHODS FOR PACKAGE MARKING FOR DELIVERY EFFICIENCY

BACKGROUND

With the popularity of e-commerce and delivery services, the volume of packages delivered continues to increase. The high volume of packages requires a fleet of delivery drivers skilled at accurately matching a package to a delivery address and efficiently delivering the package. Delivery vehicles can transport dozens, hundreds and even thousands of packages. A delivery route is often determined to efficiently deliver the packages. A delivery driver must find each package from within the delivery vehicle, requiring the driver to sort through large volumes of packages. Delivery drivers may arrange the packages in a manner that facilities efficient delivery (e.g., by address or zip code). However, arranging or ordering the packages in a delivery vehicle in a manner for efficient delivery is often time-consuming and detracts from time that could be spent delivering the packages. Accordingly, there is a need to facilitate efficient delivery of a large volume of packages.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
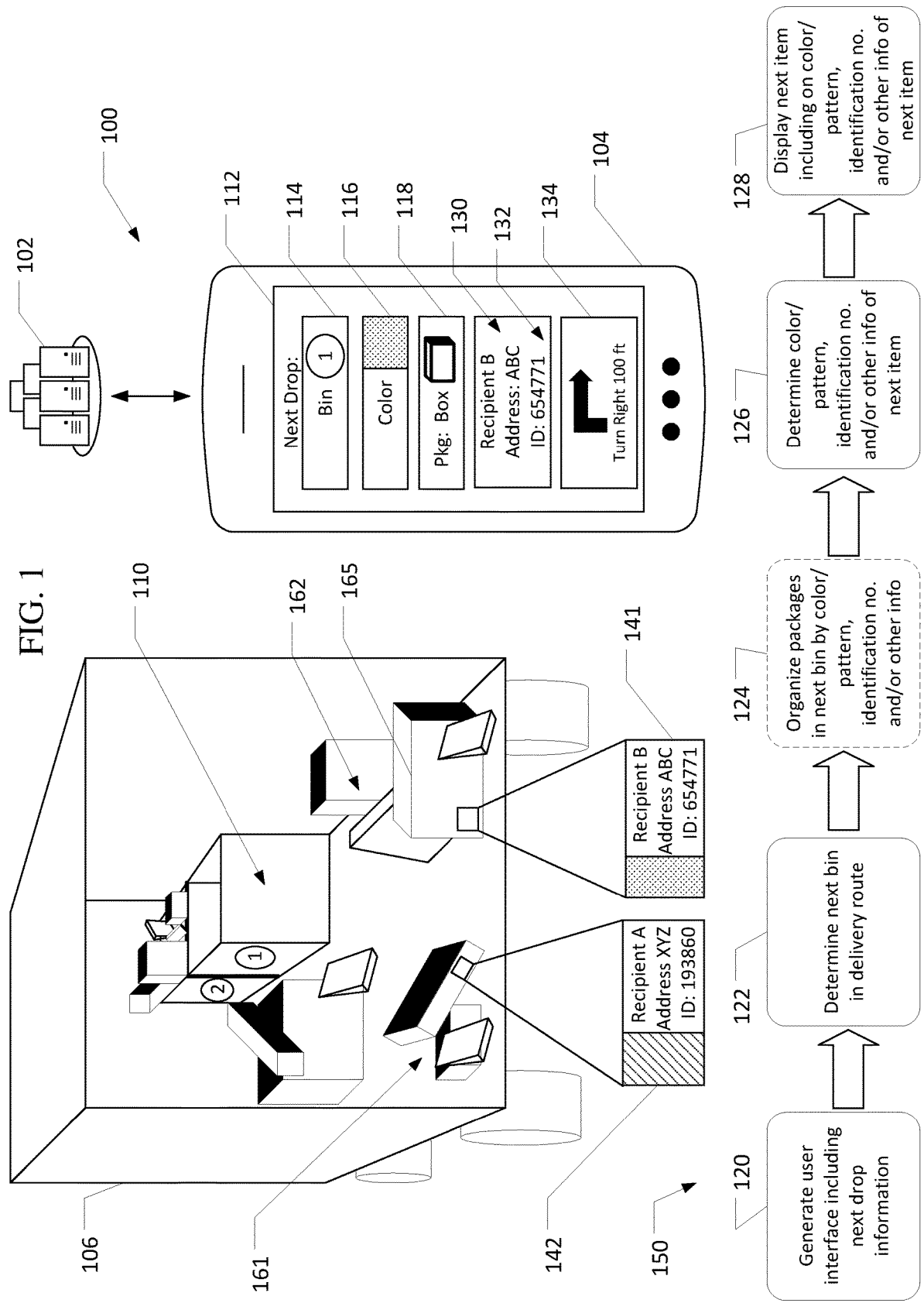
FIG. 1 is a schematic illustration of an example use case for a delivery system for presenting visual indicators on a user device for sorting and identifying packages in accordance with one or more example embodiments of the disclosure.

The systems and methods herein may be used to determine a location of a delivery address with respect to a delivery route and determine a visual indicator based on the location along the delivery route to facilitate efficient sorting and delivery of the package. For example, a specific color and/or pattern (e.g., hash marks, polka dot, etc.) may be assigned to packages within a close proximity to one another along the delivery route. A delivery platform may maintain associations of packages and visual indicators and may inform a delivery driver of the visual indicator associated with each a package at each delivery location. The delivery driver may then quickly sort through the load of packages in a delivery vehicle to find and deliver a particular package.

The delivery system may determine orders having delivery addresses within a certain radius or otherwise geographically similarly oriented and may then determine an optimized delivery route for delivering associated packages in an efficient manner. Based on the delivery route, the delivery system may determine a series of bins that will be transported in a delivery vehicle and that will carry the delivery packages for a given delivery route. Packages may each be assigned to a specific bin based on their location along a delivery route. Packages within a close proximity to one another along the delivery route may be assigned the same bin.

To facilitate sorting of packages in each bin and efficient selection of a particular package from each bin, packages may be assigned one of several visual indicators. Visual indicators are readable and identifiable by a human. For example, each bin may contain packages with visual indicators of four or more different colors (e.g., yellow, blue, red, green). It is understood that the colors used as visual indicators may have different hues that may be selected to maximize differentiation and/or contrast between each for the colors. For example, hues most easily identifiable and differentiable for individuals having a color vision deficiency (i.e., color blindness) may be selected. The delivery system may assign a color to each package along the delivery route (e.g., the delivery route may be split up into yellow, blue, red, and green segments). Alternatively, colors may be assigned such that packages intended to be delivered consecutively along a delivery route have different colors. It is understood that different colors and/or patterns may be used.

A delivery driver may carry a user device that may communicate with a delivery platform that oversees the delivery route and maintains the association between each package and the assigned visual indicator. The delivery platform may cause the user device to display information about the delivery route and each package on the delivery route, such as the recipient, address, type of box, visual indicator, and/or bin assigned to the package. Based on this information, the delivery driver may efficiently sort through the packages loaded on a delivery vehicle and select a desired package.

Providing information such as the visual indicator as well as the recipient, address, type of package, and/or bin assigned to the package may help the delivery driver more efficiently sort the packages and identify a specific package. For example, if a delivery driver knows that several of the next delivery stops (e.g., a sequence of four consecutive delivery stops) on the delivery route all have a red visual indicator, the delivery driver can remove all red packages from the bin and may even sort the packages alphabetically (e.g., by recipient or street name) or otherwise arrange the packages (e.g., by identification number or other unique identifier), to more quickly identify a package from the delivery load. This can save a driver a significant amount time and improve delivery time. Alternatively, packages in sequence along a delivery route may be assigned different colors and quick selection of the desired packages may be similarly be facilitated by sorting the packages by color and only searching the sorted packages of the assigned color.

Referring to FIG. 1, an example use case of delivery system 100 is illustrated for determining a visual indicator for a package and facilitating efficient delivery the package. Delivery system 100 may include delivery platform 102, user device 104, and delivery vehicle 106. Delivery system 100 may further include a fulfillment center device (not shown), responsible for printing labels and/or depositing the packages into a specific bin. Delivery platform 102 may be one or more computing devices with a processor.

User device 104 may be any computing device including a processor and may include a user input (e.g., touch screen, buttons, microphone, keyboard, etc.), a display (e.g., screen), and/or a speaker. For example, user device 104 may be wireless mobile devices such as smartphones, tablets, smartwatches or bracelets, smart glasses (or any other type of wearable), electronic trackers, smart sensors, and the like.

Delivery vehicle 106 may be any vehicle having a processor, a display, a user input and/or a speaker. Further user device 104 and/or delivery vehicle 106 may include well-known tracking devices such as GPS tracking devices. Alternatively, user device 104 may be incorporated into delivery vehicle 106. It is further understood that delivery vehicle 106 may be any type of delivery vehicle (e.g., car, truck, train, plane, boat, motorcycle, drone, etc.).

Delivery platform 102 may communicate with user device 104 and/or delivery vehicle 106. For example, delivery platform 102 and user device 104 (and optionally delivery vehicle 106) may run an application (e.g., cloud-based application) accessed via user device 104 (and optionally delivery vehicle 106) via which delivery platform 102 may share information (e.g., via messages) with user device 104 (and optionally delivery vehicle 106). Alternatively, the application on user device 104 may be a local application.

User device 104 and/or delivery vehicle 106 may also share information (e.g., location information and/or delivery confirmation) with delivery platform 102. Delivery platform 102, user device 104 and/or delivery vehicle 106 may communicate via any well-known wired or wireless system (e.g., Bluetooth, Bluetooth Low Energy (BLE), near field communication protocol, Wi-Fi®, cellular network, etc.).

As shown in FIG. 1, delivery vehicle 106 may be a delivery truck that may carry a large volume of packages having different weights, sizes, and/or shapes. Delivery vehicle 106 may include several bins (e.g., bin 110) that may contain several packages. The bins may be used to organize the packages in delivery vehicle 106. Packages may be strategically deposited in a certain bin at a fulfillment center and each bin may be loaded in delivery vehicle 106. Bins may be placed in order in delivery vehicle 106 such that bins are sequentially emptied as the driver delivers packages.

To initiate the actions of using a visual indicator on a package to sort packages in a delivery vehicle 106 and identify a package on a delivery route, example process flow 150 is presented and may be performed. At a block 120, delivery platform 102 may generate a user interface and cause user device 104 to display the user interface on user device 104. As is shown in FIG. 1, user interface 112 displays various information about each package and/or the next package for drop off along the delivery route. As user device 104 and/or delivery vehicle 106 may share the location of each respective device, delivery platform 102 may determine the next package for delivery based on the location information received from user device 104 and/or delivery vehicle 106. In some examples, delivery platform 102 may determine the next package for delivery based on the user completing the previous delivery (e.g., scanning the package, taking a picture of the delivered package, etc.).

User interface 112 may be a graphic user interface that may display, for example, bin information 114, visual indicator information 116, package information 118, recipient information 130, unique identifier 132 and/or navigation information 134. Bin information 114 may indicate a bin label (e.g., bin number, value and/or number) in which the package is located and/or may identify where the bin is located within delivery vehicle 106. Visual indicator 116 may include a description and/or visual representation of the visual indicator assigned to a package.

As shown in FIG. 1, labels 141 and 142 are applied to respective packages. Label 141 includes a visual indicator (dotted pattern), recipient name ("B") and a delivery address ("ABC"). Label 142 similarly includes a visual indicator (such as color, or as illustrated, hashing), recipient name ("A") and a delivery address ("XYZ"). Additionally, each of label 141 and 142 may include a unique identifier. The unique identifier may be an order number, package number, driver package number, mnemonic word/phrase, and/or any other unique identifier value. It is understood that a label may include any other information that may be helpful for delivery or identifying packages.

Package information 118 may include a description of the type of package (e.g., box, pouch, envelope, cylinder, etc.) and/or include a visual representation or even an image of the package. Recipient information 130 may include the recipient's name and/or the recipient's address. Unique identifier 132 may include a unique identification value and/or other identification value. Navigation information 134 may include navigation information for the next delivery location. It is understood that user interface 112 may additionally or alternatively appear on a display of delivery vehicle 106.

At block 122, a delivery driver using user device 104 may determine the next bin in the delivery route. For example, a delivery driver may view user interface 112 on user device 104 and may determine that the next package on the delivery route is in bin 1 based on bin information 114. At optional block 124, a delivery driver may organize the packages in a specific bin (e.g., bin 1) by the visual indicator (e.g., color/pattern), identification and/or any other information (e.g., recipient name, address, box type). Alternatively, it is understood that the delivery driver may not organize the packages in a bin by color, but instead may search through the bin at each delivery stop for the desired package based on the visual indicator and/or any other identifier from user interface 112 (e.g., package type).

As shown in FIG. 1, packages 161 may be sorted from packages 162. Packages 161 may each have the same hashing visual indicator shown in label 142 and packages 162 may each have the same dotted visual indicator shown in label 141. By separating packages 161 and 162, the number of candidate packages to select from in identifying a specific package (e.g., ID 654771) can be significantly reduced. For example, if there are four different visual indicators, packages can be separated into four groups and the sorting time to find specific package may be reduced by disregarding 75% of the packages in a certain bin. This improvement can be magnified when a combination of visual indicators are used. For example, colors and patterns can both be used (e.g., four color visual indicators and each color has four pattern visual indicators).

At block 126, a delivery driver may determine a visual indicator, identification no, and/or other information (e.g., box type, recipient name, recipient address) of the next package for delivery using user interface 112. For example, box 165 may be identified as the next package for delivery because it is from bin 1, includes the dotted visual indicator of visual indicator 116, and also matches the package information 118, recipient information 130, and recipient information 132 of user interface 112.

At block 128, upon delivering box 165 to Recipient "B", user interface 112 may display the next package for delivery including the visual indicator, identification number, and/or other information (e.g., box type, recipient name, recipient address). For example, a delivery driver may indicate that the previous package (e.g., box 165) was delivered and/or delivery system 100 may use the location information of user device 104 and delivery vehicle 106 to determine to display information associated with the next package for delivery.

One or more illustrative embodiments of the disclosure have been described above. The above examples of technical features and/or technical effects of example embodiments of the disclosure are merely illustrative and not exhaustive. The above-described embodiments are merely illustrative of the scope of this disclosure and are not intended to be limiting in any way. Accordingly, variations, modifications, and equivalents of embodiments disclosed herein are also within the scope of this disclosure. For example, it is understood that user interface 112 and/or labels 141 and 142 may include different and/or additional information. The above-described embodiments and additional and/or alternative embodiments of the disclosure will be described in detail hereinafter through reference to the accompanying drawings.

Illustrative Process and Use Cases

Figure 2A:
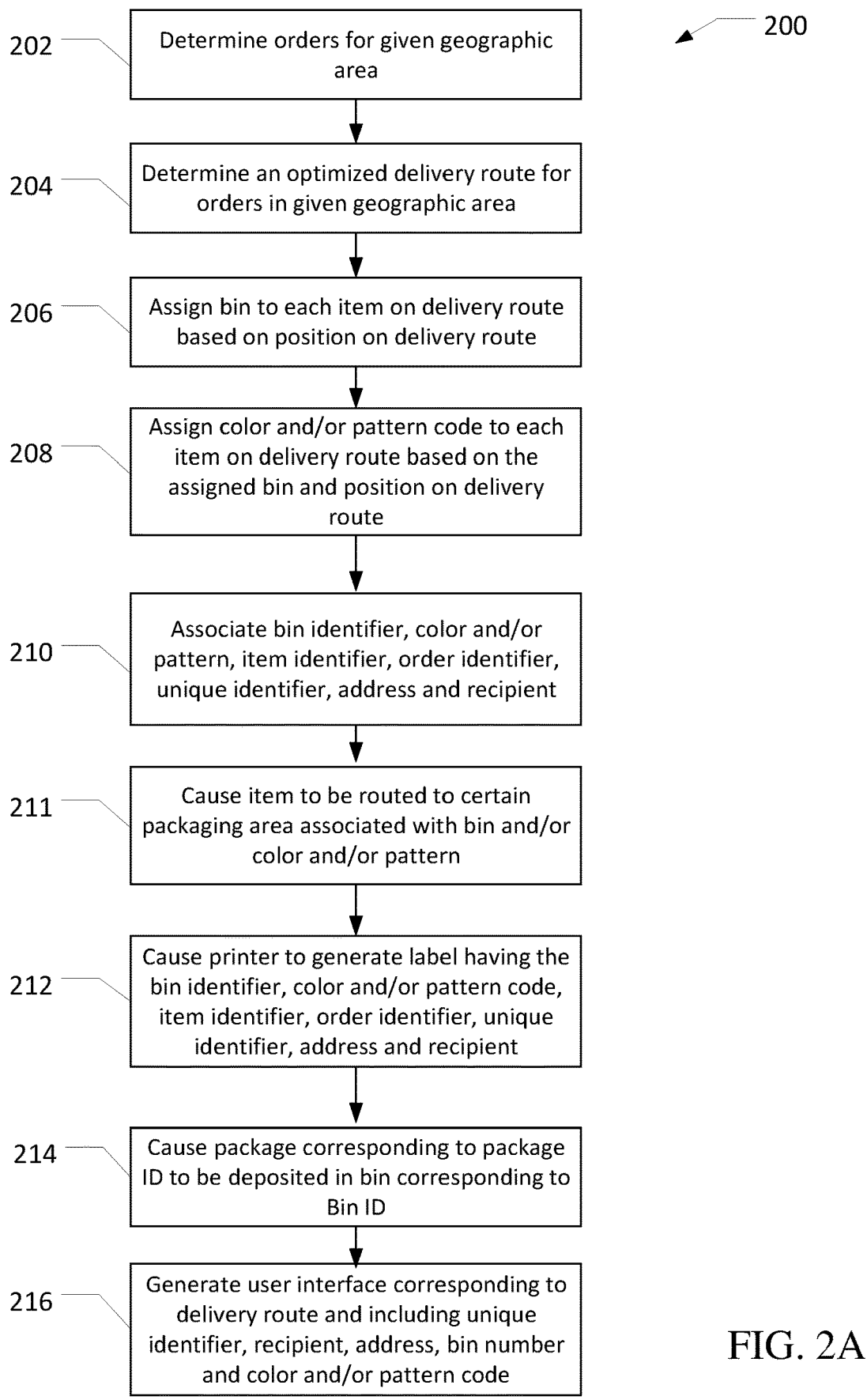
FIGS. 2A-2B are exemplary process flows for a delivery system for marking a package with a visual indicator and generating a user interface with the visual indicator in accordance with one or more example embodiments of the disclosure.

FIG. 2A depicts an example process flow 200 for a delivery system for marking a package with a visual indicator and generating a delivery interface with the visual indicator to facilitate package sorting and identification in a delivery vehicle. While example embodiments of the disclosure may be described in the context of various computing devices, it should be appreciated that the disclosure is more broadly applicable to various types of computing devices, servers mobile or wearable devices as well as devices such as smart-sensors and the like. Some or all of the blocks of the process flows in this disclosure may be performed in a distributed manner across any number of devices. The operations of the process flow 200 may be optional and may be performed in a different order.

At block 202, computer-executable instructions stored on a memory of a device, such as a delivery platform, may be executed to determine orders for a given geographic area. For example, orders of various items (e.g., products) may be made on an e-commerce website or application, each having a delivery and/or order date and a delivery address. Based on the delivery and/or order date and the delivery address, orders may be grouped together. For example, orders on for given day having a delivery address within a 10-mile radius may be grouped together.

At block 204, computer-executable instructions stored on a memory of a device, such as a delivery platform, may be executed to determine an optimized delivery route for items in orders with a delivery address in a given geographic area. The optimized route may determine the best order of deliveries and best way to navigate local streets and/or highways to result in the most time efficient delivery route.

At block 206, computer-executable instructions stored on a memory of a device, such as a delivery platform, may be executed to assign a bin to each item on the delivery route based on a position in the delivery route. The delivery vehicle may hold several bins and at block 206 the delivery platform may associate a specific item and/or package to a specific bin. The graphic user interface of the user device may then indicate for each item, which bin the item has been assigned to and deposited into. For example, a certain bin may be assigned to a consecutive sequence of delivery addresses (e.g., 16 consecutive packages) along a delivery route.

At block 208, computer-executable instructions stored on a memory of a device, such as a delivery platform, may be executed to assign a visual indicator (e.g., color and/or pattern) to each item to be delivered on the delivery route based on the bin assigned to the item and the position of the corresponding delivery address on the delivery route. For example, if each bin holds sixteen packages and there are four colors used as visual indicators, every four consecutive delivery addresses on the delivery route assigned to that bin may be assigned the same color. It is understood that greater or fewer colors and/or packages may be selected. Alternatively, the visual indicator may be randomly assigned to each package and/or item.

At block 210, computer-executable instructions stored on a memory of a device, such as a delivery platform, may be executed to associate a bin (e.g., bin identifier), visual indicator (color and/or pattern), item identifier, order identifier, unique identifier, address and/or recipient. For example, the delivery platform may maintain a package database and for each item packaged, the delivery platform may record in the database the type of package (e.g., box, pouch, cylinder), a visual indicator on a label on the package and/or on the package itself, an item identifier, an order identifier, a unique identifier, a recipient, an address, a bin in which the package is or will be deposited, a delivery route, a delivery driver, a delivery vehicle, and/or any other relevant information. This database may be updated if any of the foregoing is changed.

At block 211, computer-executable instructions stored on a memory of a device, such as a delivery platform, may be executed to cause an item to be routed to a certain packing area associated with a certain bin and/or visual indicator (e.g., color and/or pattern). For example, based on the bin identifier and/or visual indicator associated with an item identifier, the delivery platform may cause the item to be routed (e.g., conveyed and/or driven) to a given delivery area having the bin and/or visual indicator. At block 212, computer-executable instructions stored on a memory of a device, such as a delivery platform, may be executed to cause a printer to generate a label having the bin identifier, color and/or pattern code, item identifier, order identifier, unique identifier, address and/or recipient or any other relevant information. For example, a printer at a fulfillment center in a packaging area may print such a label and adhere or otherwise apply the label to the package. It is understood that the label may be alternatively printed directed onto the package.

At block 214, computer-executable instructions stored on a memory of a device, such as a delivery platform, may be executed to cause the package with the label to be deposited in the assigned bin. For example, a conveyor (e.g., conveyor belt, rollers, chutes, and/or any other well-known package conveyor) at the fulfillment center may advance the package into the assigned bin. Alternatively, or additionally, the package may be manually placed into a bin.

At block 216, computer-executable instructions stored on a memory of a device, such as a delivery platform, may be executed to database associate each item and/or package with a bin identifier, color and/or pattern code, item identifier, order identifier, unique identifier, address, recipient, box type and/or any other relevant delivery information. The database may be accessed by the user device and the information from the database may be presented on the graphic interface on the user device.

Figure 2B:
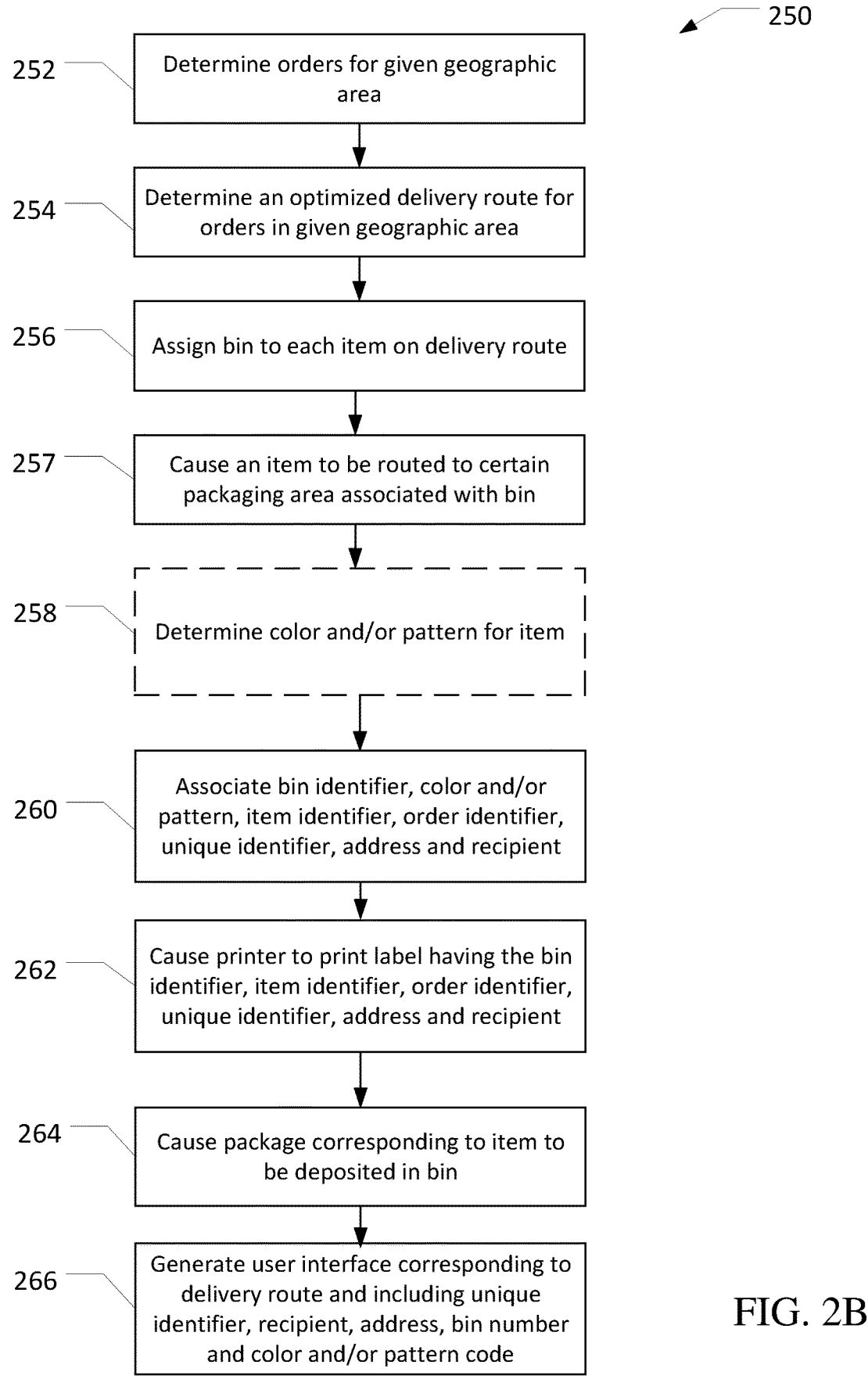

FIG. 2B depicts an example process flow 250 for a delivery system for marking a package with a visual indicator and generating a delivery interface with the visual indicator to facilitate package sorting and identification in a delivery vehicle. While example embodiments of the disclosure may be described in the context of various computing devices, it should be appreciated that the disclosure is more broadly applicable to various types of computing devices, servers mobile or wearable devices as well as devices such as smart-sensors and the like. Some or all of the blocks of the process flows in this disclosure may be performed in a distributed manner across any number of devices. The operations of the process flow 250 may be optional and may be performed in a different order.

At block 252, computer-executable instructions stored on a memory of a device, such as a delivery platform, may be executed to determine orders for a given geographic area. Block 252 may be the same as block 202 of FIG. 2A. At block 254, computer-executable instructions stored on a memory of a device, such as a delivery platform, may be executed to determine an optimized delivery route for items in orders with a delivery address in a given geographic area. Block 254 may be the same as block 204 of FIG. 2A.

At block 256, computer-executable instructions stored on a memory of a device, such as a delivery platform, may be executed to assign a bin to each item on the delivery route (e.g., based on a position in the delivery route). Block 256 may be the same as block 206 of FIG. 2A. At block 257, computer-executable instructions stored on a memory of a device, such as a delivery platform, may be executed to cause an item to be routed to a certain packing area associated with a certain bin. For example, based on the bin identifier associated with an item identifier, the delivery platform may cause the item to be routed (e.g., conveyed and/or driven) to a given delivery area having the bin associated with the bin identifier.

At block 258, computer-executable instructions stored on a memory of a device, such as a delivery platform, may be executed to determine a visual indicator (e.g., color and/or pattern) for the item. The visual indicator may be randomly assigned and/or may be selected based on the packaging, tape, and/or label assigned to and/or available in a given delivery area. For example, tape having a certain color may be used to secure a package containing the item. The delivery platform may know the visual indicator and/or may receive this information (e.g., a fulfillment center device may use computer vision or other well-known techniques to identify the visual indicators and communicate such information to the delivery platform).

At block 260, computer-executable instructions stored on a memory of a device, such as a delivery platform, may be executed to associate a bin (e.g., bin identifier), visual indicator (color and/or pattern), item identifier, order identifier, unique identifier, address and/or recipient. Block 260 may be the same as block 210 of FIG. 2A. At block 262, computer-executable instructions stored on a memory of a device, such as a delivery platform, may be executed to cause a printer to print or otherwise generate a label having the bin identifier, item identifier, order identifier, unique identifier, address and/or recipient or any other relevant information. For example, a printer at a fulfillment center in a packaging area may print such a label and adhere or otherwise apply the label to the package. It is understood that the label may be alternatively printed directly onto the package.

At block 264, computer-executable instructions stored on a memory of a device, such as a delivery platform, may be executed to cause the package to be deposited in the assigned bin. Block 264 may be the same as block 214 of FIG. 2A. At block 266, computer-executable instructions stored on a memory of a device, such as a delivery platform, may be executed to database associate each item and/or package with a bin identifier, color and/or pattern code, item identifier, order identifier, unique identifier, address, recipient, box type and/or any other relevant delivery information. Block 266 may be the same as block 216 of FIG. 2A.

Figure 3A:
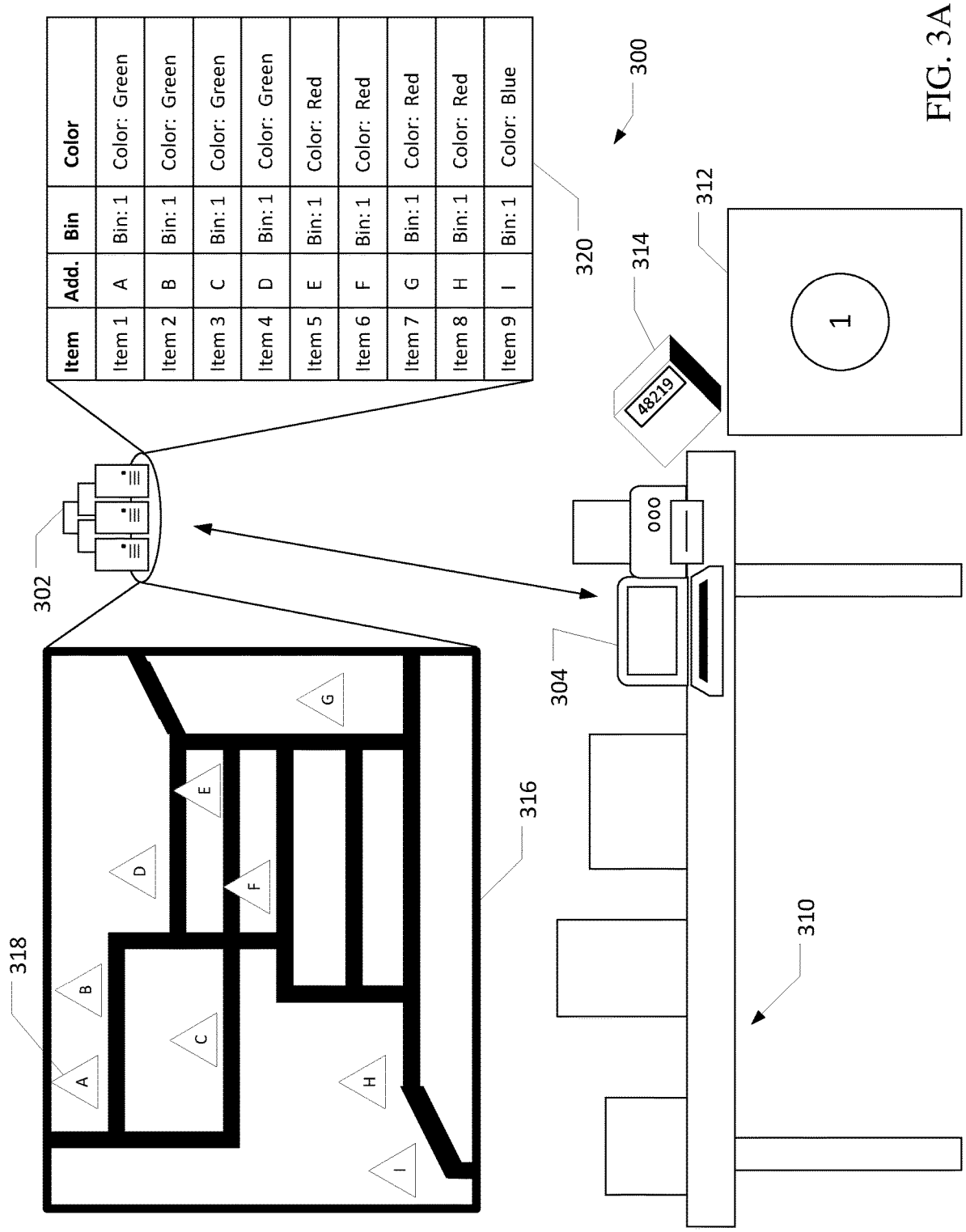
FIG. 3A is a schematic illustration of an example use case of a fulfillment center device in communication with a delivery platform in accordance with one or more example embodiments of the disclosure.

FIG. 3A depicts an example use case of delivery system 300 for determining a visual indicator for a package, applying the label to the package, and depositing the labeled package in an assigned bin. As shown in FIG. 3A, delivery system 300 may include delivery platform 302, which may be the same or similar to delivery platform 102 of FIG. 1, and fulfillment center device 304. Delivery system 300 may further include a user device (e.g., user device 104 of FIG. 1) and a delivery vehicle (e.g. delivery vehicle 106 of FIG. 1).

Fulfillment center device 304 may be any computing device with a processor and may further include a printer device that may generate a package label that may be adhered or otherwise applied to a package. Fulfillment center device 304 may be capable of printing a label or causing a label to be printed with only one visual indicator (e.g., only one color and/or pattern) or alternatively fulfillment center device 304 may be capable of printing a label with a variety of visual indicators (e.g., multiple colors and/or multiple patterns). It is understood that the visual indicator may be a property of the label or material on which the label is printed on, or may be printed onto the label by fulfillment center device 304. It is further understood that the information otherwise provided on the package label may be printed directly onto the package and/or stamped onto the package.

Fulfillment center device 304 may be in communication with delivery platform 302. For example, fulfillment center device 304 may communicate with delivery platform 302 via any well-known wired or wireless system (e.g., Bluetooth, Bluetooth Low Energy (BLE), near field communication protocol, Wi-Fi®, cellular network, Ethernet, etc.). Fulfillment center device 304 may simultaneously be in communication with other fulfillment center devices, user devices and/or delivery vehicles.

Fulfillment center device 304 may be positioned in a fulfillment center in which items that have been purchased or are otherwise are set to be delivered are packaged and/or loaded onto delivery vehicles. For example, fulfillment center device 304 may be positioned near a packaging area for packaging such items and/or a staging area for loading packages into bins and ultimately into a delivery vehicle. As shown in FIG. 3, fulfillment center device 304 may be positioned on or near conveyor system 310, which may be a system used to transport packages from one location in the fulfillment center to another (e.g., via a conveyor belt).

Conveyor system 310 may terminate at a bin such as bin 312. In this example, Conveyor system 310 may cause a package, such as package 314 to traverse conveyor system 310 and may deposit package 314 into bin 312. Prior to depositing package 314 into bin 312, the package may be scanned first (e.g., an item, order, or package identifier may be scanned). The delivery platform may associate the package with the bin for which the package will be deposited and make a record in a database of such association. Fulfillment center device 304 may generate a label corresponding to the package and/or item packaged therein. It is understood that fulfillment center device 304 may cause the label to be applied to the package or alternatively, another device or individual in close proximity to fulfillment center device 304 may cause the label to be applied to the package.

Fulfillment center device 304 may receive information from delivery platform 302 for populating the label. Delivery platform 302 may maintain or otherwise access delivery route 316 which may be an optimized delivery route. For example, delivery route 316 may include a delivery position (e.g., delivery position 318) for each address on delivery route 316. It is understood that delivery route 316 may be updated and rerouted if the delivery vehicle deviates from the original delivery route.

Delivery platform 302 may also maintain or access database 320 which may correspond to delivery route 316 and may include information corresponding to each item and/or order on the delivery route, an address for each item/order, a bin for each item/order, and an assigned or selected visual indicator (e.g., color and/or pattern) for each item and/or order. For example, the visual indicator may be scanned and communicated to the delivery platform or may be otherwise known by the delivery platform. It is understood that database 320 may include any other information regarding the delivery route, packages, and/or orders such as recipient's name, unique identifiers, and the like. Some or all of this information may be used to populate the label.

Figure 3B:
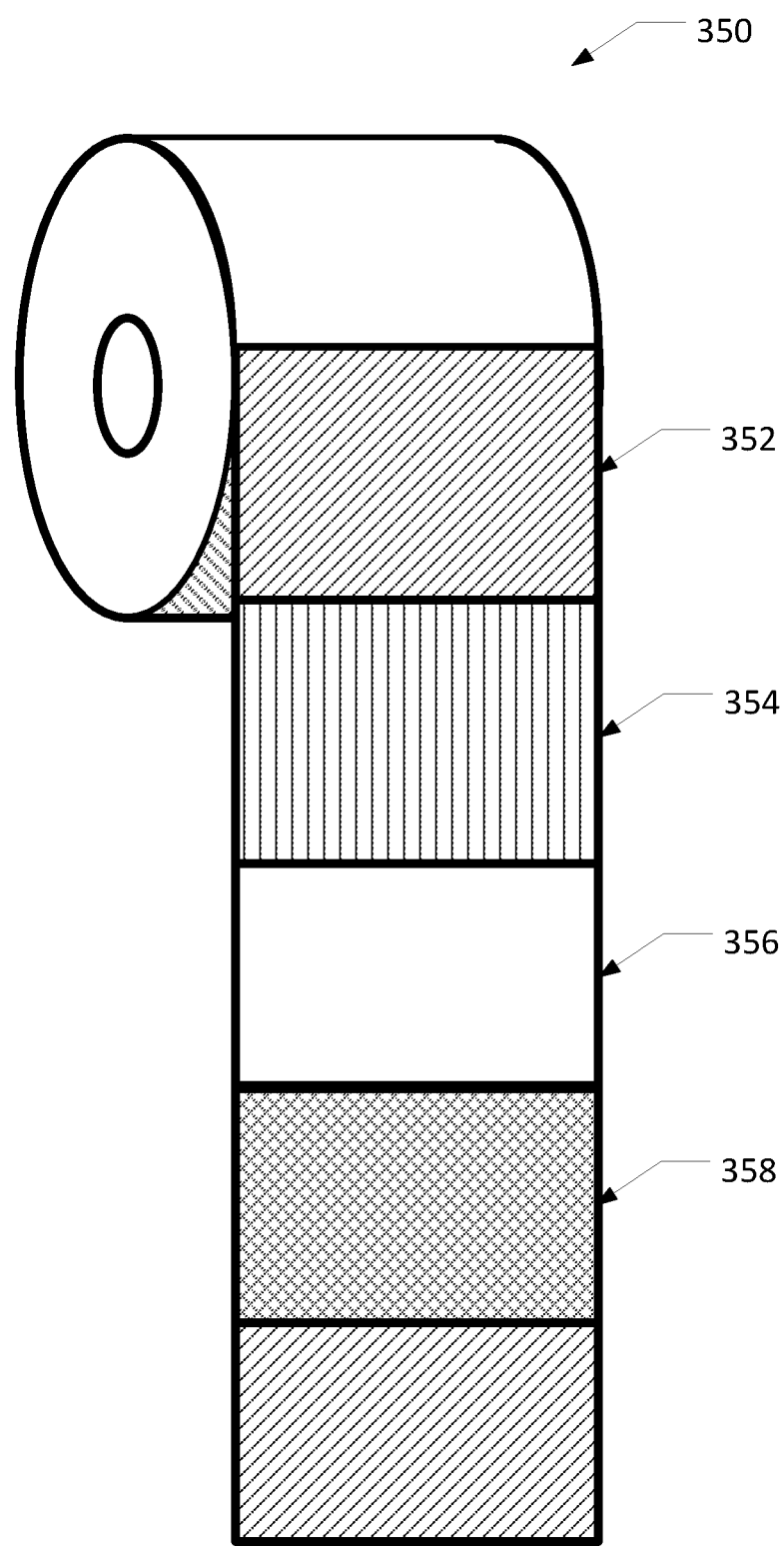
FIG. 3B is a schematic illustration of an example mixed visual indicator adhesive in accordance with one or more example embodiments of the disclosure.

Referring now to FIG. 3B, an example mixed visual indicator adhesive is illustrated. Mixed visual indicator adhesive 350 may be a spool of adhesives having a variety of different visual indicators (e.g., colors or patterns) that may alternate or change after a given length (e.g., every 6 inches). For example, mixed visual indicator adhesive 350 may include visual indicator 352, visual indicator 354, visual indicator 356, and visual indicator 358, each of which may be a different color and/or pattern. The visual indicators of mixed visual indicator adhesive 350 may be arranged in a shuffled, randomized, or repetitive pattern.

Figure 4A:
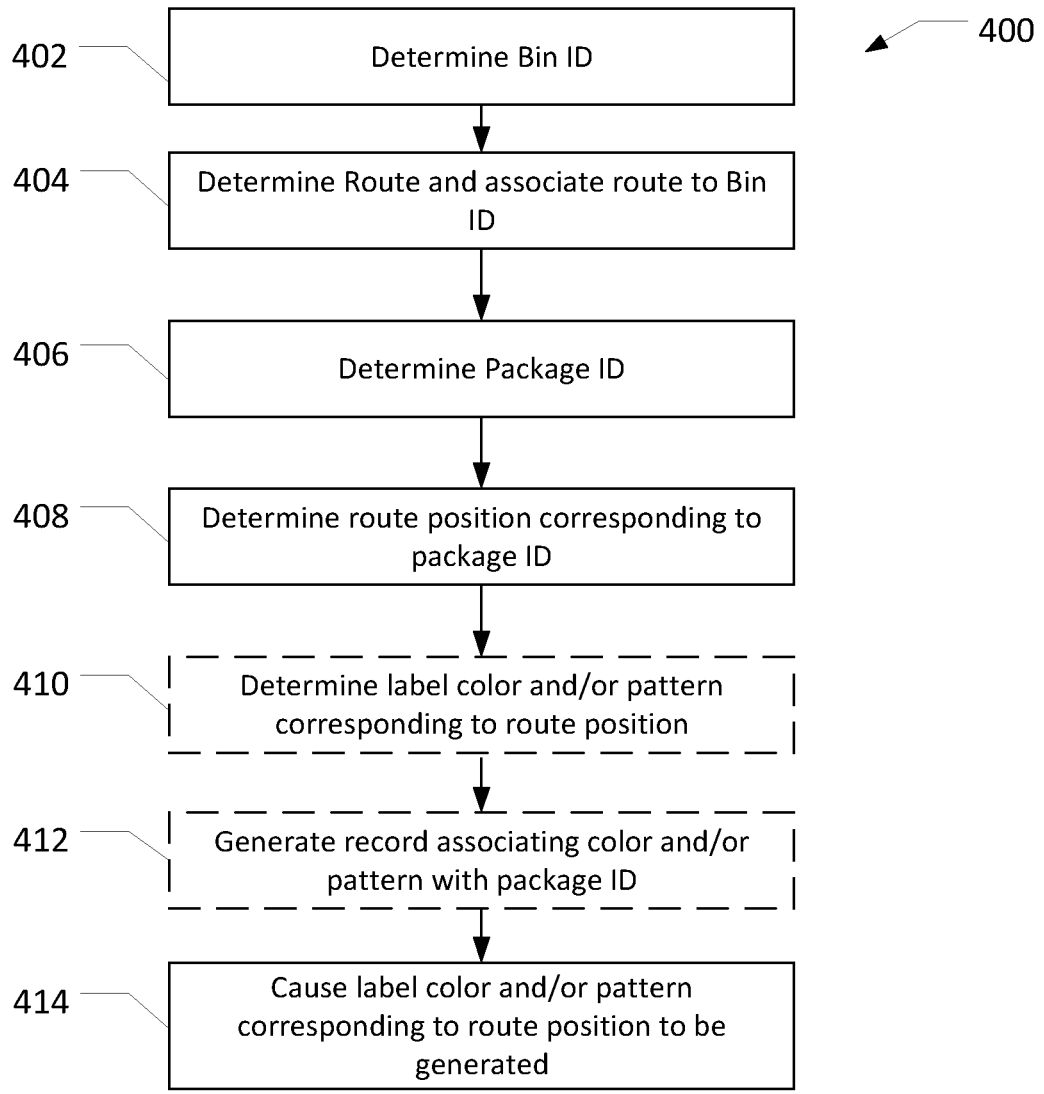
FIGS. 4A-4B are exemplary process flows for a delivery platform for determining and/or selecting a visual indicator and generating a label in accordance with one or more example embodiments of the disclosure.

Referring now to FIG. 4A, an example process flow 400 for a delivery platform and/or fulfillment center device for generating a label is depicted. While example embodiments of the disclosure may be described in the context of various computing devices, it should be appreciated that the disclosure is more broadly applicable to various types of computing devices, servers mobile or wearable devices as well as devices such as smart-sensors and the like. Some or all of the blocks of the process flows in this disclosure may be performed in a distributed manner across any number of devices. The operations of the process flow 400 may be optional and may be performed in a different order.

At block 402, computer-executable instructions stored on a memory of a device, such as a delivery platform and/or fulfillment center device, may be executed to determine a bin identifier. For example, a bin at the end of a conveyor system may have an identification value and that value may be communicated to the delivery platform. At block 404, computer-executable instructions stored on a memory of a device, such as a delivery platform and/or fulfillment center device, may be executed to determine a predetermined route and associate the route and the bin identifier.

At block 406, computer-executable instructions stored on a memory of a device, such as a delivery platform and/or fulfillment center device, may be executed to determine a package identifier. For example, each item and/or order may be assigned a specific identifier that may be determined by the delivery platform. At block 408, computer-executable instructions stored on a memory of a device, such as a delivery platform and/or fulfillment center device, may be executed to determine a position on the delivery route corresponding to the package identifier (e.g., based on the item/order's delivery address).

At optional block 410, computer-executable instructions stored on a memory of a device, such as a delivery platform and/or fulfillment center device, may be executed to determine a visual indicator (e.g., color and/or pattern) corresponding to the delivery addresses position on the route. For example, if each bin holder holds sixteen packages and there are four colors used as visual indicators, every four consecutive delivery addresses on the delivery route assigned to that bin may be assigned the same color. Alternatively, the visual indicator may be randomly assigned. Where the visual indicator is randomly assigned, the random selection may be designed to achieve even distribution of the visual indicator per bin. It is understood that any well-known randomization approach and/or algorithm may be employed (e.g., the Fisher-Yates shuffle).

At block 412, computer-executable instructions stored on a memory of a device, such as a delivery platform and/or fulfillment center device, may be executed to generate a record (e.g., in a database) associating a visual indicator (e.g., color and/or pattern) with a package identifier. In this manner, the database may maintain which packages are assigned to which visual indicators.

At block 414, computer-executable instructions stored on a memory of a device, such as a delivery platform and/or fulfillment center device, may be executed to cause a label to be generated having the visual indicator determined at block 410. In some examples, rather than creating a label with a visual indicator, a box (or other packaging such as a bag or pouch) already containing the visual indicator can be selected. Alternatively or additionally, rather than creating a label, the box (or other packaging) can be sealed using a packaging tape or other adhesive already containing the visual indicator. In this example, there may be several options for packaging tape at a sealing location and a sealer (person or machine) may select a given tape corresponding to the visual indication selected in block 410. Alternatively, tape and/or any other adhesive may be selected having randomized and/or strategically selected sequence of colors and/or patterns. For example, the tape and/or adhesive may alternate between a number (e.g., four) of distinct colors having a certain length (e.g., every four feet). The same pattern may repeat or the colors may be randomized to achieve diversity.

Figure 4B:
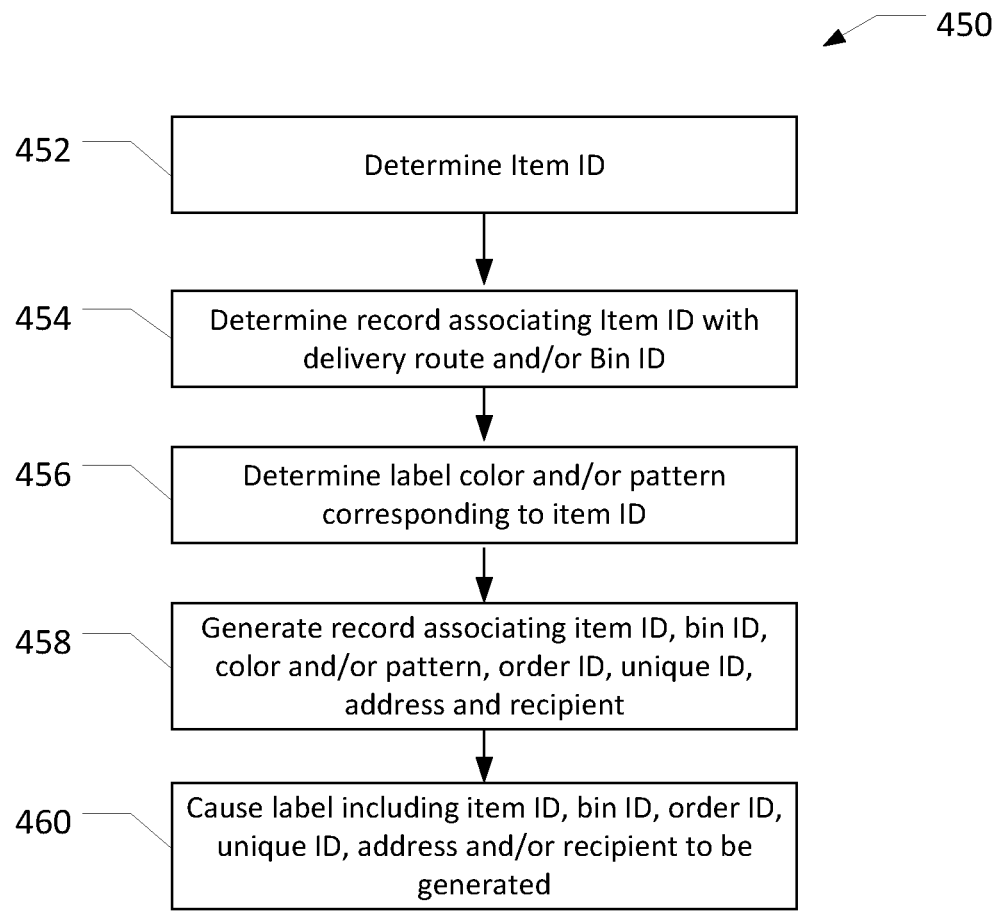

Referring now to FIG. 4B, an example process flow 450 for a delivery platform and/or fulfillment center device for generating a label is depicted. While example embodiments of the disclosure may be described in the context of various computing devices, it should be appreciated that the disclosure is more broadly applicable to various types of computing devices, servers mobile or wearable devices as well as devices such as smart-sensors and the like. Some or all of the blocks of the process flows in this disclosure may be performed in a distributed manner across any number of devices. The operations of the process flow 450 may be optional and may be performed in a different order.

At block 452, computer-executable instructions stored on a memory of a device, such as a delivery platform and/or fulfillment center device, may be executed to determine an item identifier. The item identifier may be determined by scanning an item (e.g., bar code or alphanumeric value) and/or identifier on the item. Alternatively, the item identifier may be communicated to the delivery platform and/or fulfillment center device. At block 454, computer-executable instructions stored on a memory of a device, such as a delivery platform and/or fulfillment center device, may be executed to determine a record associating the item identifier with a certain delivery route and/or bin identifier.

At block 456, computer-executable instructions stored on a memory of a device, such as a delivery platform and/or fulfillment center device, may be executed to determine a visual indicator corresponding to the item identifier. For example, a certain item may be directed to a certain packaging area based on the delivery route and/or bin identifier associated with the item identifier and the packing area may be associated with a given visual indicator. Alternatively, a fulfillment center device may determine a visual indicator associated with the item using computing vision and/or any other visualization or sensing techniques. For example, a fulfillment center device may determine that the item has been packed using a green box and/or green tape.

At block 458, computer-executable instructions stored on a memory of a device, such as a delivery platform and/or fulfillment center device, may be executed to generate a record associating the item identifier, bin identifier, visual indicator (e.g., color and/or patterns), order identifier, unique identifier, address associated with the order and/or recipient associated with the order. At block 460, computer-executable instructions stored on a memory of a device, such as a delivery platform and/or fulfillment center device, may be executed to cause a label to be generated having the item identifier, bin identifier, order identifier, unique identifier, address and/or recipient information.

Figure 5:
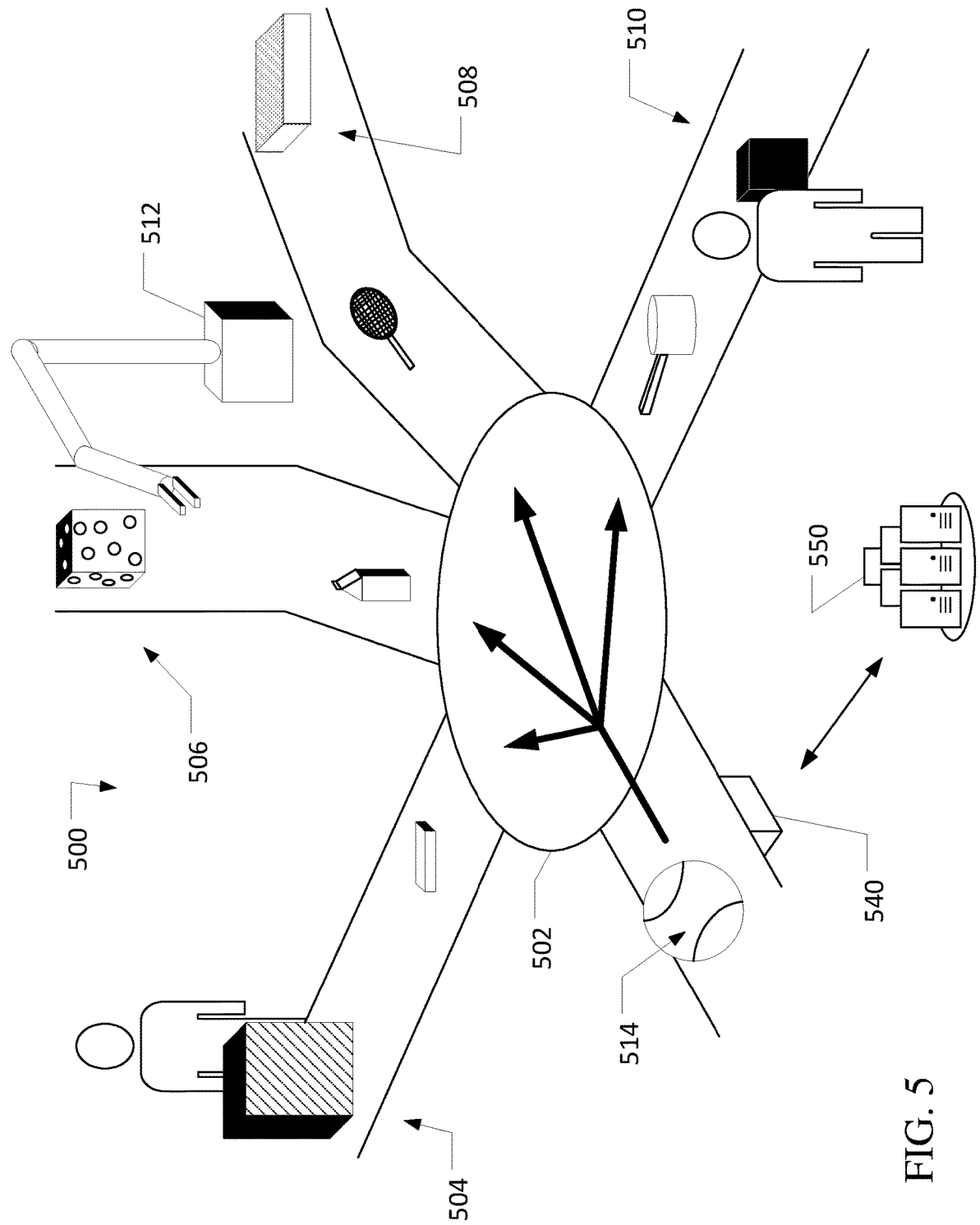
FIG. 5 is a schematic illustration of an example use case for routing an item to a packaging area in accordance with one or more example embodiments of the disclosure.

FIG. 5 depicts an example use case of packaging system 500 for causing an item to be packaged with a package (e.g., box, pouch, cylinder) having a certain visual identifier that may be visible from all angles of the package. For example, the walls or surface of the packaging material itself may be a certain color and/or pattern or include a certain color and/or pattern (e.g., along the edges of a box or a pouch). Alternatively, or additionally, the visual indicators such as a distinct word or even an image may be used. This approach may be an alternative to the visual indicator present on the label of the package, which may only be visible from one side of the package.

In one example, the package itself may include a celebrity's image or other well-known image or representation. The visual indicator may serve the dual purpose of visual indication for package identification and advertising. For example, a soon to be released movie promotion may be the visual indicator (e.g., the name of a movie and an image of a well-known character from the movie) and may also serve as an advertisement. The visual indicator could be a tape and/or adhesive, a stamp, a location specific label (e.g., label in right-hand corner vs. center or package).

As shown in FIG. 5, conveyor system 502, which may be a series of conveyor belts and/or other well-known conveyor surfaces. Conveyor system 502 may include conveyor device 540 which may be any computing device having a processor and may control conveyor system 502. Conveyor device 540 may be in communication with delivery platform 550, which may be the same or similar to delivery platform 102 of FIG. 1.

Conveyor system 502 may receive an item (e.g., item 514) and direct the item to one of several packaging areas depending on the desired visual indicator. For example, packaging system 500 may include packaging area 504, which may package items with hashed patterned packaging (e.g., boxes, pouches, cylinders, etc.), packaging area 506, which may package items with polka dot patterned packaging, packaging area 508, which may package items with white packaging, and packaging area 510, which may package items with black packaging.

Conveyor system 502 may direct the item to the packaging area based on the visual indicator assigned to the item by the delivery system based on the delivery route. At each packaging area, an individual or a robotic device (e.g., robot 512) may place the item in the appropriate package. It is understood that upon being packaged, each item may be directed via conveyor system 502 to an appropriate bin for transportation to the delivery address.

Alternatively, packaging areas 504, 506, 508, and 510 may each have the same types of packages having the same visual indicators. However, diversity of the visual indicators may be achieved by each package type (e.g., box, pouch, cylinder) each having a different color and/or pattern from the other package types. For example, the large box shown in area 504 may have a hashed pattern, the medium box shown in area 506 may have a polka-dot pattern, the flat box shown in area 508 may be white, and the small box shown in area 510 may be black. When the various packages are deposited at random into a bin, the bin will have packages with varying visual indicators. In yet another example, boxes and/or tape having randomized color patterns may be employed. For example, a spool of tape may change color after a given length (e.g., mixed visual indicator adhesive 350 of FIG. 3B) and/or boxes having varying visual indicators may be randomized and selected at random.

Illustrative Device Architecture

Figure 6:
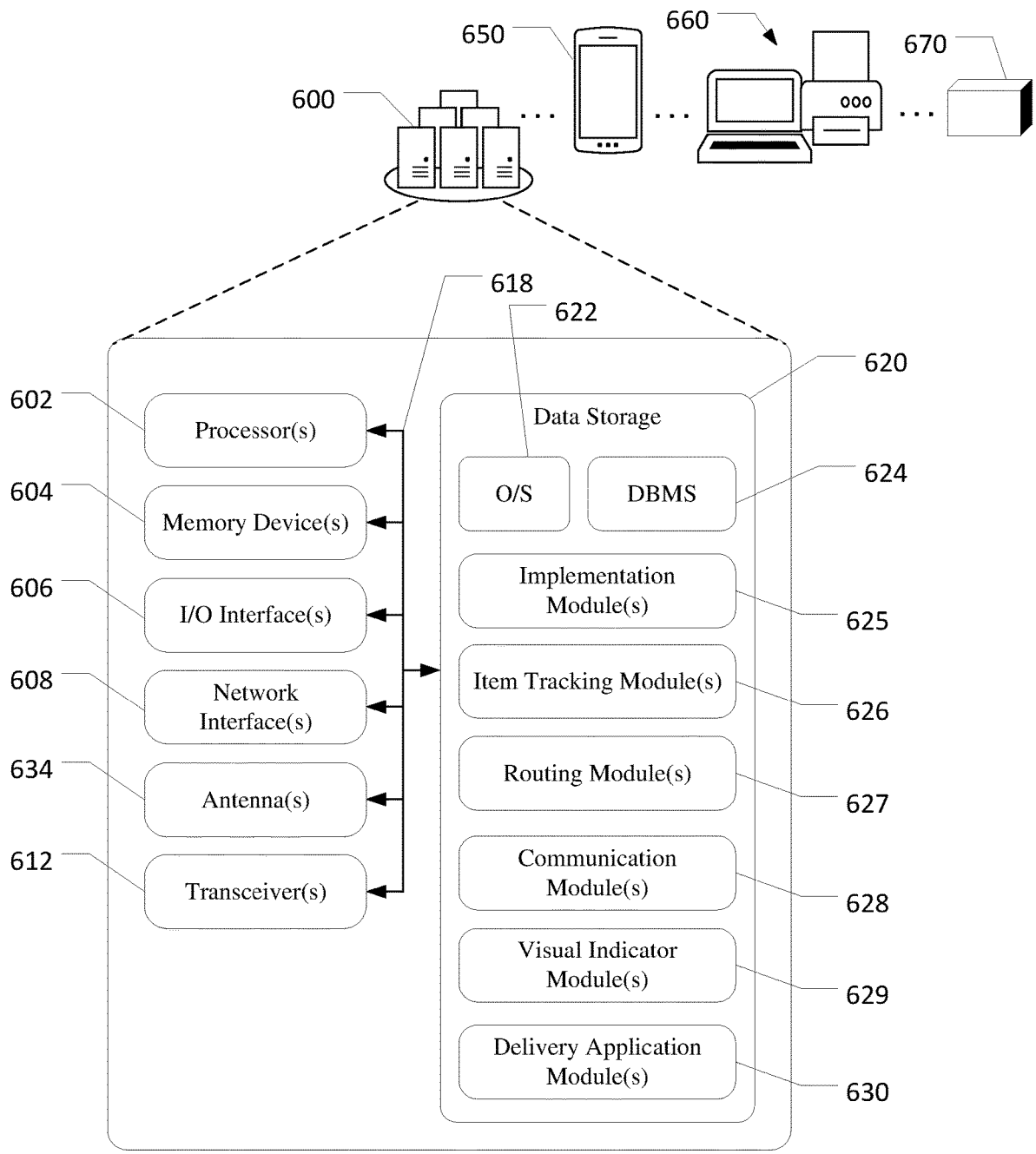
FIG. 6 is a schematic block diagram of an illustrative delivery platform in accordance with one or more example embodiments of the disclosure.

FIG. 6 is a schematic block diagram of an illustrative delivery platform 600 in accordance with one or more example embodiments of the disclosure. The delivery platform 600 may include any suitable computing device capable of receiving and/or sending data, and may optionally be coupled to devices including, user devices, delivery vehicles, fulfillment center devices, conveyor devices, and any other devices such as a smartphone, tablet, e-reader, mobile device, wearable device, a connected device, a desktop computer, a laptop computer, one or more servers, or the like. The delivery platform 600 may correspond to an illustrative device configuration for delivery platform 102, delivery platform 302, delivery platform 550 and any other delivery platforms of FIGS. 1-6.

The delivery platform 600 may be configured to communicate (e.g., one or more networks) with user device 650, which may be the same or similar to user device 104 of FIG. 1, fulfillment center device 660, which may be the same or similar to fulfillment center device 304 of FIG. 3, and/or conveyor device 670, which may be the same or similar to conveyor device 540 of FIG. 5. Delivery system 600 may additionally communicate via one or more networks with one or more servers, user devices, connected devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the delivery platform 600 may include one or more processors (processor(s)) 602, one or more memory devices 604 (generically referred to herein as memory 604), one or more input/output (I/O) interface(s) 606, one or more network interface(s) 608, one or more transceivers 612, one or more antenna(s) 634, and data storage 620. The delivery platform 600 may further include one or more buses 618 that functionally couple various components of the delivery platform 600. The delivery platform 600 may further include one or more antenna(e) 634 that may include, without limitation, a cellular antenna for transmitting or receiving signals to/from a cellular network infrastructure, an antenna for transmitting or receiving Wi-Fi® signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHZ antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the delivery platform 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the delivery platform 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more optional database management systems (DBMS) 624; and one or more program module(s), applications, engines, computer-executable code, scripts, or the like such as, for example, one or more implementation module(s) 625, one or more item tracking module(s) 626, one or more routing module(s) 627, one or more communication module(s) 628, one or more visual indicator module(s) 629, and/or one or more delivery application module(s) 630. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the delivery platform 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the delivery platform 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the implementation module(s) 625 may include computer-executable instructions, code, or the like that responsive to execution by one or more of the processor(s) 602 may perform functions including, but not limited to, overseeing coordination and interaction between one or more modules and computer executable instructions in data storage 620, determining user selected actions and tasks, determining actions associated with user interactions, determining actions associated with user input, determining user devices associated with a user account, sending signals to user devices, electronic devices, other computing devices, servers, datastores and the like, initiating commands locally or at remote devices, and the like.

The item tracking module(s) 626 may include computer-executable instructions, code, or the like that responsive to execution by one or more of the processor(s) 602 may perform functions including, but not limited to, tracking items in inventory at one or more fulfillment centers, orders for such items, the location of each item in the fulfillment center, and the like.

The routing module(s) 627 may include computer-executable instructions, code, or the like that responsive to execution by one or more of the processor(s) 602 may perform functions including, but not limited to, overseeing orders, deliveries and generating a delivery route for performing delivery of items and otherwise fulfilling orders.

The communication module(s) 628 may include computer-executable instructions, code, or the like that responsive to execution by one or more of the processor(s) 602 may perform functions including, but not limited to, communicating with one or more devices, for example, via wired or wireless communication, communicating with user devices, conveyor devices, fulfillment center devices and delivery vehicles, communicating with servers (e.g., remote servers), communicating with remote datastores and/or databases, sending or receiving notifications or commands/directives, communicating with cache memory data, communicating with user devices, and the like.

The visual indicator module(s) 629 may include computer-executable instructions, code, or the like that responsive to execution by one or more of the processor(s) 602 may perform functions including, but not limited to, assigning a visual indicator (e.g., color and/or pattern) to each package. For example, based on the location of a delivery address along a delivery route, the visual indicator module 629 may assign a package a visual indicator to facilitate package sorting and identification.

The delivery application module(s) 630 may include computer-executable instructions, code, or the like that responsive to execution by one or more of the processor(s) 602 may perform functions including, but not limited to, determining an optimized delivery route for packages corresponding to orders having similar order fulfillment dates and/or close proximity in corresponding delivery addresses.

Referring now to other illustrative components depicted as being stored in the data storage 620, the O/S 622 may be loaded from the data storage 620 into the memory 604 and may provide an interface between other application software executing on the delivery platform 600 and hardware resources of the delivery platform 600. More specifically, the O/S 622 may include a set of computer-executable instructions for managing hardware resources of the delivery platform 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The optional DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the delivery platform 600 is a mobile computing device, the DBMS 624 may be any suitable light-weight DBMS optimized for performance on a mobile device.

Referring now to other illustrative components of the delivery platform 600, the optional input/output (I/O) interface(s) 606 may facilitate the receipt of input information by the delivery platform 600 from one or more I/O devices as well as the output of information from the delivery platform 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; and so forth. Any of these components may be integrated into the delivery platform 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The delivery platform 600 may further include one or more network interface(s) 608 via which the delivery platform 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a Bluetooth antenna configured to transmit or receive signals in accordance with established standards and protocols, such as Bluetooth and/or BLE. Alternatively, or in addition to, antenna(e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHZ channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum (e.g., 900 MHz).

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the delivery platform 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the delivery platform 600. The transceiver(s) 612 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 6 as being stored in the data storage 620, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the delivery platform 600 and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the delivery platform 600 may include alternate and/or additional hardware, software, or firmware components beyond those described or depicted without departing from the scope of the disclosure. More particularly, it should be appreciated that software, firmware, or hardware components depicted as forming part of the delivery platform 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method for marking a package with a color, the method comprising:
   determining a first package, a second package, and a third package, the first package associated with a first type of package, the second package associated with a second type of package, and the third package associated with a third type of package;
   determining a first address corresponding to the first package;
   determining a second address corresponding to the second package;
   determining a third address corresponding to the third package;
   determining a delivery route based on the first address, the second address, and the third address;
   determining the first package corresponds to a first color based on a location of the first address with respect to the delivery route;
   associating the first color to the first package;
   determining the second package corresponds to the first color based on a location of the second address with respect to the delivery route;
   associating the first color to the second package;
   determining the third package corresponds to a second color based on a location of the third address with respect to the delivery route;
   assigning the first package, second package, and third package to a first bin associated with a delivery vehicle based on the delivery route;
   causing a conveyor system to direct the first package to a first printer and the third package to a second printer;
   causing a first label for the first package to be generated by the first printer, the first label having the first color;
   causing a second label for the third package to be generated by the second printer, the second label having the second color;
   causing the first label to be affixed to the first package and the second label to be affixed to the second package;
   causing the conveyor system to deposit the first, second, and third packages into the first bin based on the first, second, and third package being assigned to the first bin; and
   sending a first message to a user device indicating that the first package is associated with the first color and the first type of package, the second package is associated with the first color and the second type of package, and the third package is associated with the second color and a third type of package,
   wherein the first label includes a first unique identifier, a first recipient, and a first address.

2. The method of claim 1, further comprising:
   determining that the first package corresponds to the first unique identifier; and
   determining that the third package corresponds to a second unique identifier,
   wherein the first label includes the first unique identifier, and the second label includes the second unique identifier.

3. The method of claim 1, further comprising:
   causing the conveyor system to direct the second package to the first printer; and
   causing a third label for the second package having the first color to be printed by the first printer.

4. The method of claim 1, further comprising:
   determining that the first package corresponds to the first unique identifier and the first recipient.

5. A method comprising:
   determining a first package, second package, and a third package, the first package associated with a first type of package, the second package associated with a second type of package, and the third package associated with a third type of package;
   associating a first visual indicator with the first package;
   associating a second visual indicator with the second package, wherein the first visual indicator is the same as the second visual indicator;
   associating a third visual indicator with the third package, wherein the second visual indicator is different from the third visual indicator;
   assigning the first package, second package, and third package to a first bin associated with a delivery route;
   causing a conveyor system to direct the first package and the second package to a first printer for application of the first and second visual indicators and to direct the third package to a second printer for application of the third visual indicator;
   causing a first label having the first visual indicator and a second label having the second visual indicator to be printed by the first printer;
   causing the first label to be affixed to the first package and the second label to be affixed to the second package;
   causing the conveyor system to deposit the first, second, and third package into the first bin based on the first, second, and third package being assigned to the first bin; and
   sending a first message to a user device indicating that the first package is associated with the first visual indicator and the first type of package, the second package is associated with the second visual indicator and the second type of package, and the third package is associated with the third visual indicator and the third type of package,
   wherein the first label includes a first unique identifier, a first recipient, and a first address.

6. The method of claim 5, further comprising:
   determining that the first package corresponds to the first unique identifier and the first recipient.

7. The method of claim 6, wherein the first message further indicates that the first package corresponds to the first unique identifier, the first recipient, and the first address.

8. The method of claim 5, further comprising randomly selecting the first visual indicator and randomly selecting the second visual indicator, wherein the first visual indicator is at least one color or pattern and is human readable and the first package visually displays the at least one color or pattern.

9. The method of claim 5, further comprising:
causing the first visual indicator to be printed on the first package, the second visual indicator to be printed on the second package, and the third visual indicator to be printed on the third package.

10. The method of claim 5, further comprising:
determining a first address corresponding to the first package and a second address corresponding to the second package; and
determining the delivery route based on the first address and the second address.

11. The method of claim 5, further comprising:
causing the first visual indicator and the second visual indicator to be printed by a first printer; and
causing the third visual indicator to be printed by a second printer.

12. A system comprising:
memory configured to store computer-executable instructions, and
at least one computer processor configured to access memory and execute the computer-executable instructions to:
determine a first package, second package and a third package, the first package associated with a first type of package, the second package associated with a second type of package, and the third package associated with a third type of package;
associate a first visual indicator with the first package;
associate a second visual indicator with the second package, wherein the first visual indicator is the same as the second visual indicator;
associate a third visual indicator with the third package, wherein the second visual indicator is different from the third visual indicator;
assign the first package, second package, and third package to a first bin associated with a delivery route;
cause a conveyor system to direct the first package and the second package to a first printer for application of the first and second visual indicators and to direct the third package to a second printer for application of the third visual indicator;
cause a first label having the first visual indicator and a second label having the second visual indicator to be printed by the first printer;
cause the first label to be affixed to the first package and the second label to be affixed to the second package;
cause the conveyor system to deposit the first, second, and third package into the first bin based on the first, second, and third package being assigned to the first bin; and
send a first message to a user device indicating that the first package is associated with the first visual indicator, the second package is associated with the second visual indicator, and the third package is associated with the third visual indicator,
wherein the first label includes a first unique identifier and a first recipient, and a first address.

13. The system of claim 12, wherein the at least one computer processor is further configured to access memory and execute the computer-executable instructions to:
determine that the first package corresponds to the first unique identifier and the first recipient.

14. The system of claim 13, wherein the first message further indicates that the first package corresponds to the first unique identifier, the first recipient, and the first address.

15. The system of claim 12, wherein the at least one computer processor is further configured to access memory and execute the computer-executable instructions to randomly select the first visual indicator and randomly select the second visual indicator, wherein the first visual indicator is at least one color or pattern and is humanly readable and the first package visually displays the at least one color or pattern.

16. The system of claim 12, wherein the at least one computer processor is further configured to access memory and execute the computer-executable instructions to:
cause the first visual indicator to be printed on the first package, the second visual indicator to be printed on the second package, and the third visual indicator to be printed on the third package.

17. The system of claim 12, wherein the at least one computer processor is further configured to access memory and execute the computer-executable instructions to:
determine a first address corresponding to the first package and a second address corresponding to the second package; and
determine the delivery route based on the first address and the second address.

18. The system of claim 12, wherein the at least one computer processor is further configured to access memory and execute the computer-executable instructions to:
cause the first visual indicator and the second visual indicator to be printed by a first printer, and
cause the third visual indicator to be printed by a second printer.

* * * * *

UNITED STATES PATENT AND TRADEMARK OFFICE
CERTIFICATE OF CORRECTION

| | | |
|---|---|---|
| PATENT NO. | : 12,124,989 B1 | Page 1 of 1 |
| APPLICATION NO. | : 17/864926 | |
| DATED | : October 22, 2024 | |
| INVENTOR(S) | : Taimoor Jawaid Khizri et al. | |

It is certified that error appears in the above-identified patent and that said Letters Patent is hereby corrected as shown below:

On the Title Page

Item (72) Inventors:
The city and state for the 6th inventor FNU Shashank Kumar should read -- Varanasi (IN) --.

Signed and Sealed this
Third Day of December, 2024

Katherine Kelly Vidal
*Director of the United States Patent and Trademark Office*